United States Patent
Yang

(10) Patent No.: US 6,930,408 B2
(45) Date of Patent: Aug. 16, 2005

(54) CIRCUIT FOR THE GENERATION OF ELECTRIC POWER OF OPPOSITE POLARITY IN A PULSATING POWER SUPPLY

(76) Inventor: Tai-Her Yang, 6F-5 No. 250, Sec. 4, Chung Hisao E. Rd., Taipei (TW)

(*) Notice: Subject to any disclaimer, the term of this patent is extended or adjusted under 35 U.S.C. 154(b) by 262 days.

(21) Appl. No.: 09/940,898

(22) Filed: Aug. 29, 2001

(65) Prior Publication Data

US 2003/0042797 A1 Mar. 6, 2003

(51) Int. Cl.$^7$ .............................................. H01F 27/42
(52) U.S. Cl. ............................ 307/104; 307/52; 307/60
(58) Field of Search ............................ 307/52, 60, 104, 307/64; 363/63

(56) References Cited

U.S. PATENT DOCUMENTS

| 5,180,964 | A | * | 1/1993 | Ewing | 323/222 |
| 5,815,388 | A | * | 9/1998 | Manley et al. | 363/63 |
| 5,999,426 | A | * | 12/1999 | Meier et al. | 363/63 |

* cited by examiner

Primary Examiner—Robert L. Deberadinis
(74) Attorney, Agent, or Firm—Bacon & Thomas, PLLC

(57) ABSTRACT

A circuit for generating electric power at the moment a D.C. pulsating power is suspended includes an induction device in series with or in parallel with the load for generating the power and supplying it to the load.

12 Claims, 3 Drawing Sheets

CIRCUIT FOR THE GENERATION OF ELECTRIC POWER OF OPPOSITE POLARITY IN A PULSATING POWER SUPPLY

BACKGROUND OF THE INVENTION (a) Field of the Invention

A circuit for generating electric power in a pulsating power supply, at the moment the D.C. pulsating power that is being delivered is suspended, makes use of an induction device in series or in parallel with the load, or alternatively an LC parallel circuit which is in series or in parallel with the load, the power thus generated being fed to the load to provide a substantial cut in production costs with enhanced operational reliability.

(b) Description of the Prior Art

In conventional arts, circuits for the generation of electric power to make up for sudden interruptions of a master D.C. pulsating power supply are carried out by cyclical exchange of polarities, which involves a much too complicated circuitry design associated with high costs.

SUMMARY OF THE INVENTION

A circuit for generating electric power in a pulsating power supply, at the moment the D.C. pulsating power that is being delivered is suspended, utilizes an induction device in series or in parallel with the load, or alternatively an LC parallel circuit which is in series or in parallel with the load so that power thus generated is fed to the load. As a result, there is a substantial cut in production costs with enhanced operational reliability.

DETAILED DESCRIPTION OF THE PREFERRED EMBODIMENTS

The invention provides a circuit for the generation of electric power at the moment delivery of D.C. pulsating power is interrupted, by means of an induction device in series or in parallel with the load, or alternatively by means of an LC parallel circuit which is in series or in parallel with the load, the power thus generated being fed to the load, resulting in a substantial cut in production costs together with enhanced operational reliability.

Figure 1:
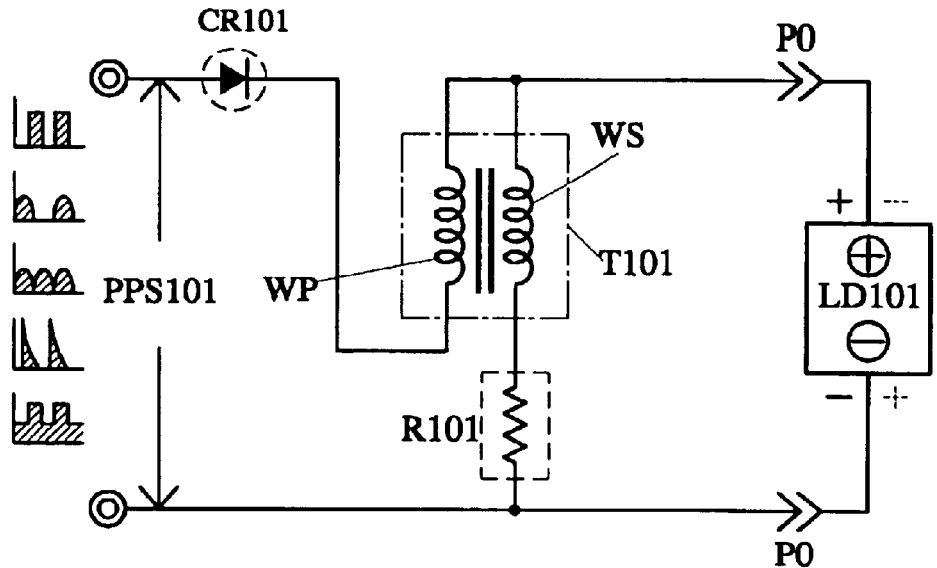
FIG. 1 is a schematic illustration of electric power generating circuitry constructed in accordance with the principles of the invention, in which the primary coil of the transformer is in series with the D.C. pulsating power supply.
Figure 2:
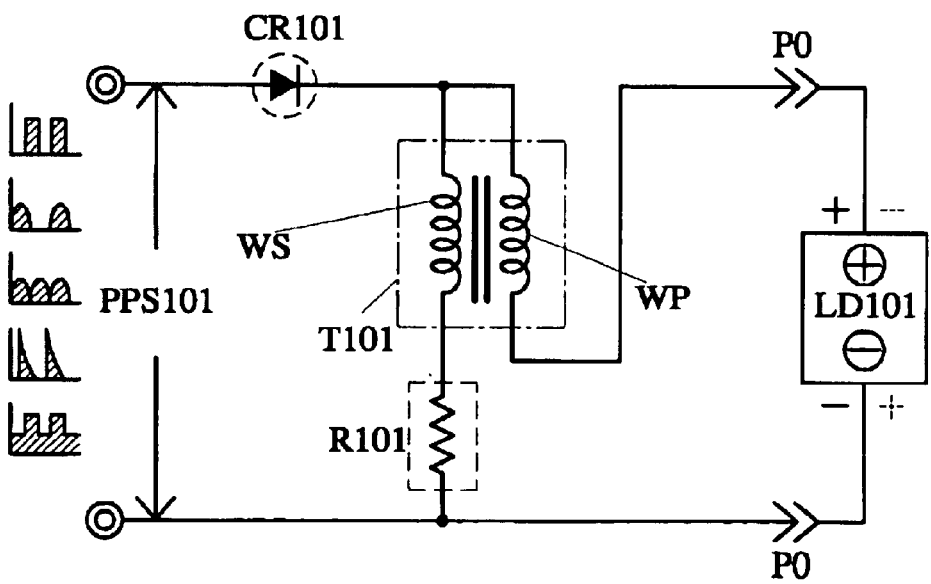
FIG. 2 is a schematic illustration of electric power generating circuitry according to the invention, in which the primary coil of the transformer is in parallel with the D.C. pulsating power supply.

FIG. 1 shows an of the invention in which the primary coil of the transformer is in series with the D.C. pulsating power supply, the essential components of which include:

a D.C. pulsating power supply PPS101 for providing pulsating D.C. currents through rectification of an A. C. source or D.C. source with linear or switching control;

a transformer T101 in the form of a cored or coreless transformer comprising coil windings or stacked coils which account for a primary winding WP and a secondary winding WS respectively; with the primary winding WP connected in series with the power supply, and the secondary winding WS optionally connected in series with a current limiting resistor R101 for parallel connection across both terminals of the power supply; or, pursuant to the variation illustrated in FIG. 2, with the secondary coil WS of the transformer being firstly connected in parallel with the pulsating D.C. power supply PPS101, followed by serial connection of the primary coil WP between the power supply and the load; it being noted that the polarity correlation between the primary coil WP and the secondary coil WS of the transformer T101 is such that a reduction or cutoff of the causal D.C. power will bring about supply of power to the load side;

a load LD101 in the form of a rechargeable secondary cell, electroplating bath, or electrolytic processing electrode together with working objects, or any other load necessitating the input of power in the event of power interruption or of a reduction in power supply;

conduction contacts or a plug/socket assembly P0 made up of electromechanical components and optionally, having one terminal connected to the charging power supply and relevant circuits on the power supply side, and the other terminal connected for coupling purposes to the load side;

optional a blocking diode CR101 in the form of a solid state diode in forward series connection with the input port of the power supply to prevent power stored in the secondary winding from flowing back to the power supply.

The following is a description of the operation of the circuits represented in both FIG. 1 and FIG. 2.

When power is simultaneously delivered from the power supply PPS101 to the load and to the primary winding WP of the transformer T101, for excitation to a steadily resistive state, both the secondary winding WS of the transformer T101 and the optionally provided current limiting resistor R101 will have normal, magnetizing currents induced therein.

Once power due to the pulsating D.C. power supply is reduced or gets cut off, power will be generated in the secondary winding WS of the transformer T101, to be delivered to the load.

Figure 3:
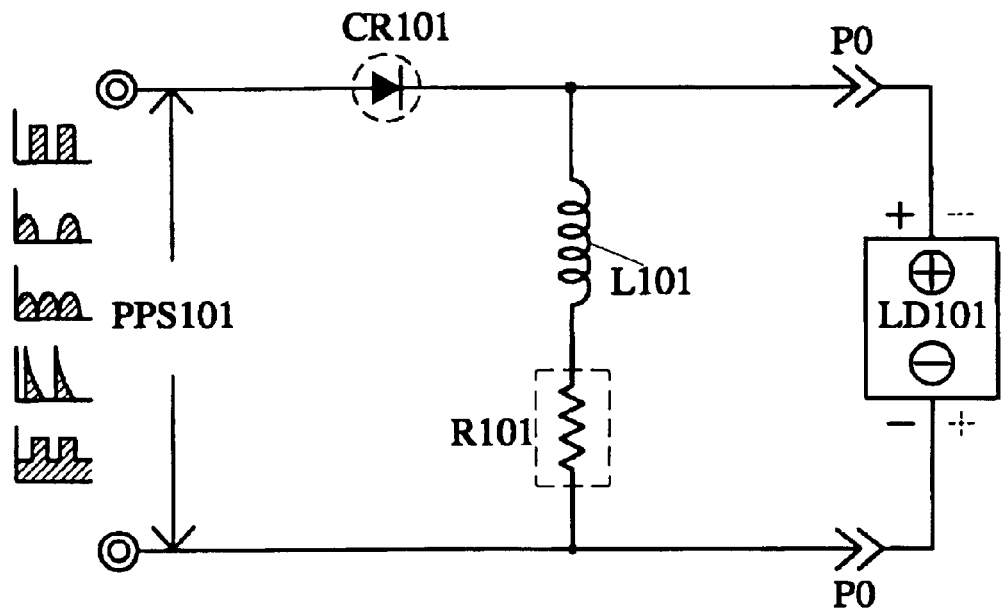
FIG. 3 is a schematic illustration of an embodiment that includes parallel inductive elements.

In the embodiment having a parallel inductance circuit, as represented in FIG. 3, the main components include:

pulsating D.C. power supply PPS101 generated in a controlled state by linear or switching elements from a rectified A.C. or D.C. power supply;

inductance L101 in the form of cored or coreless inductors wound in coiled or stacked formation, for parallel connection across both terminals of the power supply and optionally connected in series with a current limiting resistor R101;

load LD101: in the form of a rechargeable secondary cell, electroplating bath, or electrolytic processing electrode together with working objects, or any other load necessitating the input of power in the event of power interruption or of a reduction in power;

conduction contacts of plug/socket assembly P0: composed of electromechanical components and, optionally, having one terminal connected to the charging power supply and relevant circuits on the power supply side, and the other terminal connected for coupling purposes to the load side;

optional blocking diode CR101 in the form of a solid state diode in forward series connection with the input port of the power supply to prevent power from running back to the power supply.

The operation of the circuit illustrated in FIG. 3 is described below:

When power due to the pulsating D.C. power supply PPS101 is available for output, it will go straight as input to the load as well as exciting the inductor L101 until the latter is driven to a steadily resistive state; and in the meantime generate normal, magnetizing current that optionally passes through the current limiting resistor R101.

Once the pulsating D.C. power supply voltage is turned down or becomes cut off, power of the will be supplied by the-inductor L101 to the load LD101.

Figure 4:
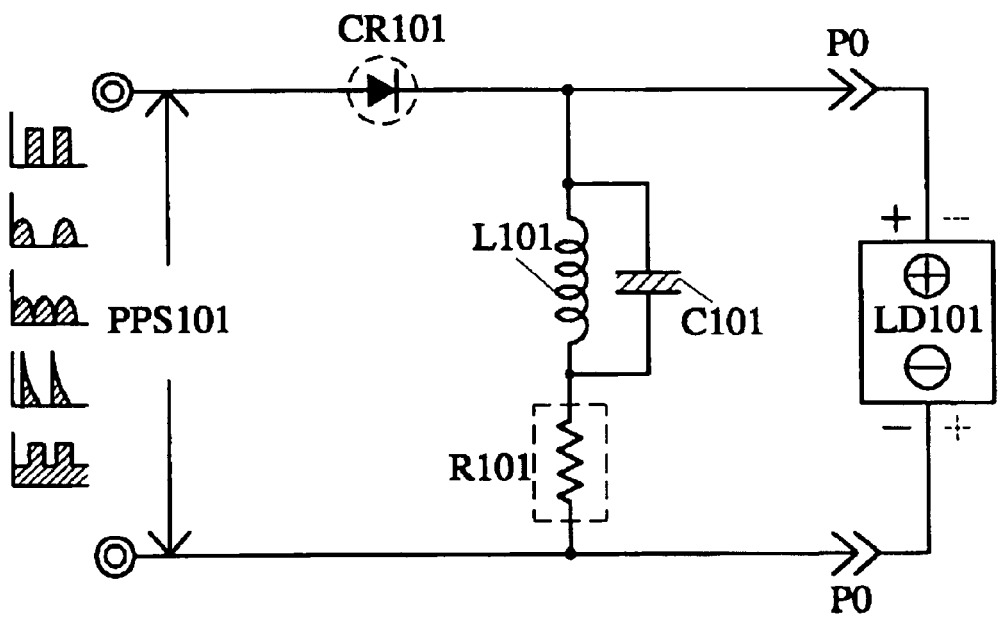
FIG. 4 is a schematic illustration of an embodiment that includes inductive elements in parallel with capacitive elements.

The circuit represented in FIG. 4 is an adaptation of the circuit shown in FIG. 3 that adds a parallel capacitor to the existing inductor, including:

pulsating D.C. Power Supply PPS101 arranged to generate pulses in a controlled state by linear or switching elements from rectified A.C. or D.C. power source;

inductance L101: in the form of cored or coreless inductors wound in coiled or stacked formation, for parallel connection across both terminals of the power supply, and optionally in series with a current limiting resistor R101;

A capacitor C101 connected in parallel with the inductor L101 to interact with the inductor L101 and respond resistively in accordance with the frequency of the pulsating D.C. power supply;

Load LD101 in the form of a rechargeable secondary cell, electroplating bath, or electrolytic processing electrode together with working objects, or any load necessitating the input of power in the event of power interruption or of a reduction in the power supply;

conduction contacts or plug/socket assembly P0: composed of electromechanical components and, optionally, having one terminal connected to the charging power supply and relevant circuits on the power supply side, and the other terminal connected for coupling purposes to the load side;

optional blocking diode CR101 in the form of a solid state diode in forward series connection with the input port of the power supply to prevent power from running back to the power supply.

What follows is a description of the operation rationale of the circuit illustrated in FIG. 4:

When the power supply PPS101 is available for output, D.C. current will be delivered straight to the load and to excite the LC parallel loop comprising inductor L101 and capacitor C101 until it turns steadily resistive and carries a normal magnetizing current, as does an optionally provided current limiting resistor R101.

Once the incoming pulsating D.C. power supply-turns down or becomes cut off, power will be generated in the LC parallel loop which consists of inductor L101 and capacitor C101 for output to the load LD101.

Figure 5:
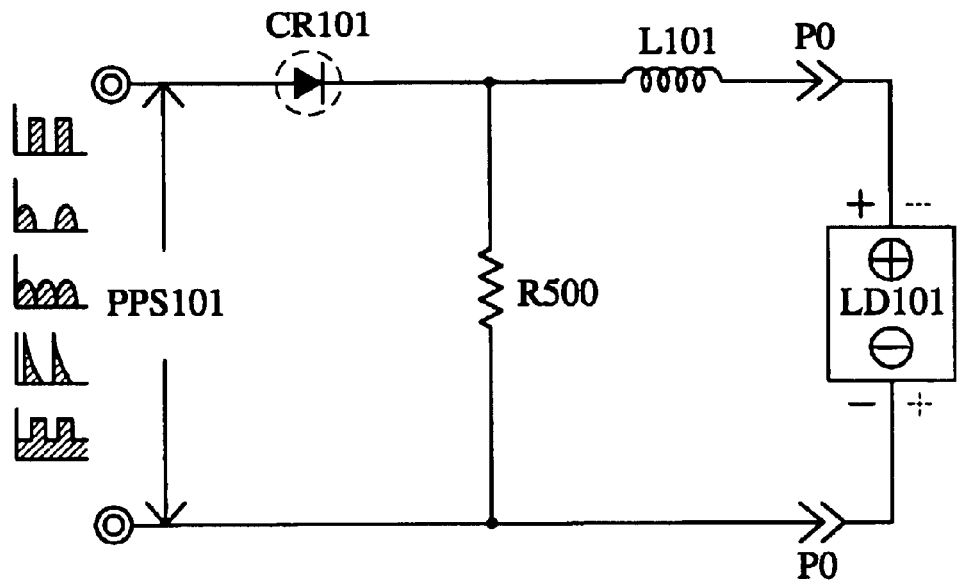
FIG. 5 is a schematic illustration of an embodiment that includes serially connected inductors; and, FIG. 6 is a schematic illustration of an embodiment that includes an LC parallel loop comprising inductive and capacitive elements.

In the circuit comprising a serially connected inductor that is shown in FIG. 5, the essential components are:

pulsating D.C. power supply PPS101 arranged to generate pulses in a controlled state by linear or switching elements, from rectified A.C. or from a D.C. power supply;

inductor L101 in the form of cored or coreless inductors wound in coiled or stacked to formation, for serial connection between the output terminal of the power supply and the load LD101;

backflow resistor R500 composed of resistive elements and parallel connected across the positive terminal of the pulsating D.C. power supply PPS101, which is in connection with the inductor L101, and the negative terminal of the same pulsating D.C. power supply PPS101, to allow for passage of power in an opposite direction;

optional blocking diode CR101 in the form of a solid state diode in forward series with the input port of the power supply to prevent power from running back to the power supply;

load LD101: in the form of a rechargeable secondary cell, electroplating bath, or electrolytic processing electrode together with working objects, or any other load necessitating the input of power in the event of power interruption or of a reduction in the power supply;

conduction contacts or plug-socket assembly P0 composed of electromechanical components and, optionally, having one terminal connected to the charging power supply and relevant circuit on the power supply side, and the other terminal connected for coupling purposes to the load side.

What follows next is a description of the operation of the circuit represented in FIG. 5;

When there is power available for output from the power supply PPS101, D.C. current will pass to the load by way of the inductor L101 in serial connection.

Should the power supply PPS101 voltage be reduced or turned off, power will be produced in the inductor L101 and delivered eventually to the load via backflow resistor R500.

Figure 6:
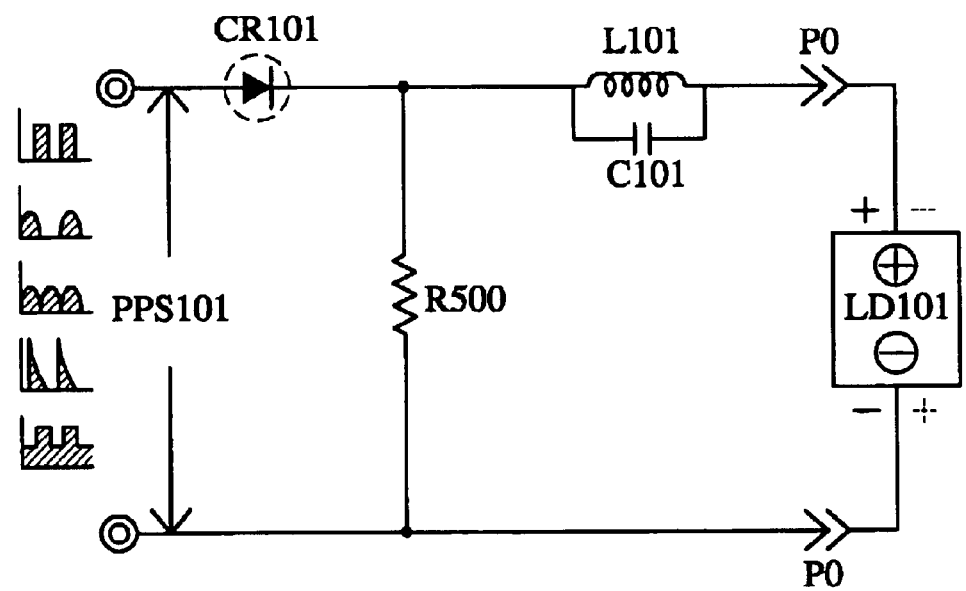

In the circuit represented in FIG. 6, an LC circuit in parallel comprising inductive and capacitive elements in series, the essential components employed including:

pulsating D.C. power supply PPS101 arranged to generate in a controlled state by linear or switching elements from a rectified A.C. or D.C. source;

inductor L101 in the form of cored or coreless inductors wound in coiled or stacked formation, for serial connection between the output terminal of the power supply and the load LD101;

capacitor C101: in parallel with the inductor L101 to interact with the inductor L101 and to respond resistively in accordance with the frequency of the pulsating D.C. Power Supply;

backflow resistor R500: composed of resistive elements and connected in parallel across the positive terminal of the pulsating D.C. power supply PPS101, which is connected to the inductor L101, and the negative terminal of the same pulsating D.C. power supply PPS101, to allow for passage of the power in the opposite direction;

optional blocking diode CR101 in the form of a solid state diode in forward series with the input port of the power supply to prevent power from running back to the power supply;

load LD101 in the form of a rechargeable secondary cell, electroplating bath, or electrolytic processing electrode together with working objects, or any other load necessitating the input of power in the event of power interruption or of a reduction in power supply, conduction contacts or plug/socket assembly P0: composed of electromechanical components and, optionally, having one terminal connected to the charging power supply and relevant circuit on the power supply side, and the other terminal for connected for coupling purposes to the load side.

What follows next is a description of the operation of the circuit illustrated in FIG. 6;

When there is power available for output from the power supply PPS101, D.C. current will run to the load by way of the inductor L101 that is in parallel with the capacitor C101.

Once the power supply PPS101 voltage is turned down or becomes cut off, power developed in the inductor L101 that is in parallel with the capacitor C101 will be delivered to the load by way of backflow resistor R500.

In summation, the generating circuit of the invention features simplicity in structure, low cost, novelty in design, precisely defined advantages, and for all these reasons is submitted to your highly esteemed authority for evaluation as to its patentability.

What is claimed is:

1. A circuit for generating power in a D.C. pulsating power supply, at the moment D.C. pulsating power that is being delivered is suspended, comprising:
   a source of pulsating D.C. power; and
   an induction device including a coil, said coil being connected between the source of pulsating D.C. power and a load, said induction device being arranged to discharge to the load when the pulsating power is suspended.

2. A circuit for generating power in a D.C. pulsating power supply as claimed in claim 1, wherein the coil of the induction device is a secondary winding of a transformer, a primary winding of the transformer being connected in series between the source of pulsating D.C. power and the load, and the secondary winding of the transformer being connected in parallel between the source of pulsating D.C. power and the load.

3. A circuit for generating power in a D.C. pulsating power supply as claimed in claim 2, further comprising a resistor connected in series with the secondary winding.

4. A circuit for generating power in a D.C. pulsating power supply as claimed in claim 1, wherein the coil of the induction device is a secondary winding of a transformer, a primary winding of the transformer being connected in parallel between the source of pulsating D.C. power and the load, and the secondary winding of the transformer being connected in series between the source of pulsating D.C. power and the load.

5. A circuit for generating power in a D.C. pulsating power supply as claimed in claim 4, further comprising a resistor connected in series with the primary winding.

6. A circuit for generating power in a D.C. pulsating power supply as claimed in claim 1, wherein the induction device is an inductor connected in parallel between the source of pulsating D.C. power and the load.

7. A circuit for generating power in a D.C. pulsating power supply as claimed in claim 6, further comprising a resistor connected in series with the inductor.

8. A circuit for generating power in a D.C. pulsating power supply as claimed in claim 6, further comprising a capacitor connected in parallel with the inductor.

9. A circuit for generating power in a D.C. pulsating power supply as claimed in claim 8, further comprising a resistor connected in series with the parallel-connected inductor and capacitor.

10. Previously Presented) A circuit for generating power in a D.C. pulsating power supply as claimed in claim 1, wherein the induction device is an inductor connected in series between the source of pulsating D.C. power and the load, and further comprising a resistor connected in parallel between the source of pulsating D.C. power and the load.

11. A circuit for generating power in a D.C. pulsating power supply as claimed in claim 10, further comprising a capacitor connected in parallel with the inductor.

12. A circuit for generating power in a D.C. pulsating power supply as claimed in claim 1, further comprising a blocking diode connected between the source of D.C. pulsating and the induction device for preventing backflow of current from the induction device to the source of D.C. pulsating power.

* * * * *